United States Patent
Kobayashi et al.

(10) Patent No.: US 11,631,917 B2
(45) Date of Patent: Apr. 18, 2023

(54) CONNECTION STRUCTURE OF ELECTRICAL JUNCTION BOX

(71) Applicants: Yazaki Corporation, Tokyo (JP); TOYOTA JIDOSHA KABUSHIKI KAISHA, Aichi-ken (JP)

(72) Inventors: Kazuki Kobayashi, Shizuoka (JP); Shinya Oishi, Shizuoka (JP); Chihiro Takahashi, Shizuoka (JP); Hirotaka Hasegawa, Shizuoka (JP); Kensuke Matsuo, Seto (JP); Michihiro Ishihara, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 182 days.

(21) Appl. No.: 17/203,819

(22) Filed: Mar. 17, 2021

(65) Prior Publication Data
US 2021/0296729 A1  Sep. 23, 2021

(30) Foreign Application Priority Data
Mar. 18, 2020 (JP) .............................. JP2020-047647

(51) Int. Cl.
*H01M 50/296* (2021.01)
*H01M 50/249* (2021.01)
(Continued)

(52) U.S. Cl.
CPC .......... *H01M 50/296* (2021.01); *B60L 50/64* (2019.02); *B60R 16/0238* (2013.01); *H01M 50/249* (2021.01); *H01M 2220/20* (2013.01)

(58) Field of Classification Search
None
See application file for complete search history.

(56) References Cited

U.S. PATENT DOCUMENTS

| 6,283,765 B1 * | 9/2001 | Lumbis | ................. B60T 17/228 439/35 |
| 2011/0133548 A1 * | 6/2011 | Toyama | ................. B60L 50/64 307/9.1 |

(Continued)

FOREIGN PATENT DOCUMENTS

| JP | H11-99832 A | 4/1999 |
| JP | 2005-247064 A | 9/2005 |

(Continued)

OTHER PUBLICATIONS www.espacenet.com machine translation of the detailed description of JP 2005247064A. (Year: 2005).*
Abstract JP 2018037209A. (Year: 2018).*

*Primary Examiner* — Gregg Cantelmo
(74) *Attorney, Agent, or Firm* — Kenealy Vaidya LLP (57) ABSTRACT

A connection structure of an electrical junction box includes: a first housing which is fixed to a vehicle and in which a through hole is formed; and a terminal block that is inserted into the through hole, has a conductor, and is supported by the first housing, wherein the conductor includes a first terminal portion placed on one side of the through hole in a penetrating direction in which the through hole penetrates the first housing, and a second terminal portion that protrudes from the first housing toward the other side in the penetrating direction and that is connected to an electric wire.

5 Claims, 7 Drawing Sheets

(51) Int. Cl.
*B60R 16/023* (2006.01)
*B60L 50/64* (2019.01)

(56) References Cited

U.S. PATENT DOCUMENTS

| | | | |
|---|---|---|---|
| 2012/0244756 A1* | 9/2012 | Jouas | H01R 13/193 |
| | | | 439/660 |
| 2016/0006147 A1* | 1/2016 | Loo | B60K 1/04 |
| | | | 439/500 |
| 2016/0118739 A1* | 4/2016 | Tomine | H01R 31/08 |
| | | | 439/660 |

FOREIGN PATENT DOCUMENTS

| | | |
|---|---|---|
| JP | 2006-50770 A | 2/2006 |
| JP | 2009-38914 A | 2/2009 |
| JP | 2012-214172 A | 11/2012 |
| JP | 2018037209 A * | 3/2018 |

* cited by examiner

CONNECTION STRUCTURE OF ELECTRICAL JUNCTION BOX

CROSS-REFERENCE TO RELATED APPLICATION(S)

The present application claims priority to and incorporates by reference the entire contents of Japanese Patent Application No. 2020-047647 filed in Japan on Mar. 18, 2020.

BACKGROUND OF THE INVENTION

1. Field of the Invention

The present invention relates to a connection structure of an electrical junction box.

2. Description of the Related Art

Conventionally, there is an electrical junction box in which a terminal block is provided. In Japanese Patent Application Laid-open No. 2006-50770, an electrical junction box with a bus bar being arranged on an upper surface side of an insulating inner cover, an outer cover being attached to the inner cover, and a terminal block for external electric wire connection being provided on the inner cover or the outer cover is disclosed.

In an electrical junction box, a configuration that can be connected to an electric wire outside a housing has been considered. For example, in a case where a wiring space of an electric wire is below a housing, efficiency of work of connecting the electric wire and an electrical junction box can be improved.

SUMMARY OF THE INVENTION

An object of the present invention is to provide a connection structure of an electrical junction box that can be connected to an electric wire outside a housing.

In order to achieve the above mentioned object, a connection structure of an electrical junction box according to one aspect of the present invention includes a first housing which is fixed to a vehicle and in which a through hole is formed; and a terminal block that is inserted into the through hole, has a conductor, and is supported by the first housing, wherein the conductor includes a first terminal portion placed on one side of the through hole in a penetrating direction in which the through hole penetrates the first housing, and a second terminal portion that protrudes from the first housing toward the other side in the penetrating direction and that is connected to an electric wire.

According to another aspect of the present invention, in the connection structure of the electrical junction box, it is preferable that the vehicle includes a battery pack arranged below an interior material included in a floor of a vehicle cabin, the first housing is accommodated inside a second housing, which is a housing of the battery pack, and is fixed to the vehicle via the second housing, and the terminal block penetrates a bottom wall of the second housing, and the second terminal portion protrudes downward from the bottom wall.

According to still another aspect of the present invention, in the connection structure of the electrical junction box, it is preferable that the bottom wall is a floor panel of the vehicle.

According to still another aspect of the present invention, in the connection structure of the electrical junction box, it is preferable that the vehicle includes a battery pack arranged below an interior material included in a floor of a vehicle cabin, the first housing is arranged between the interior material and a floor panel of the vehicle, and the terminal block penetrates the floor panel, and the second terminal portion protrudes downward from the floor panel.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, a connection structure of an electrical junction box according to an embodiment of the present invention will be described in detail with reference to the drawings. Note that this invention is not limited to this embodiment. Also, components in the following embodiment include what can be easily assumed by those skilled in the art and what is substantially the same.

EMBODIMENT

Figure 1:
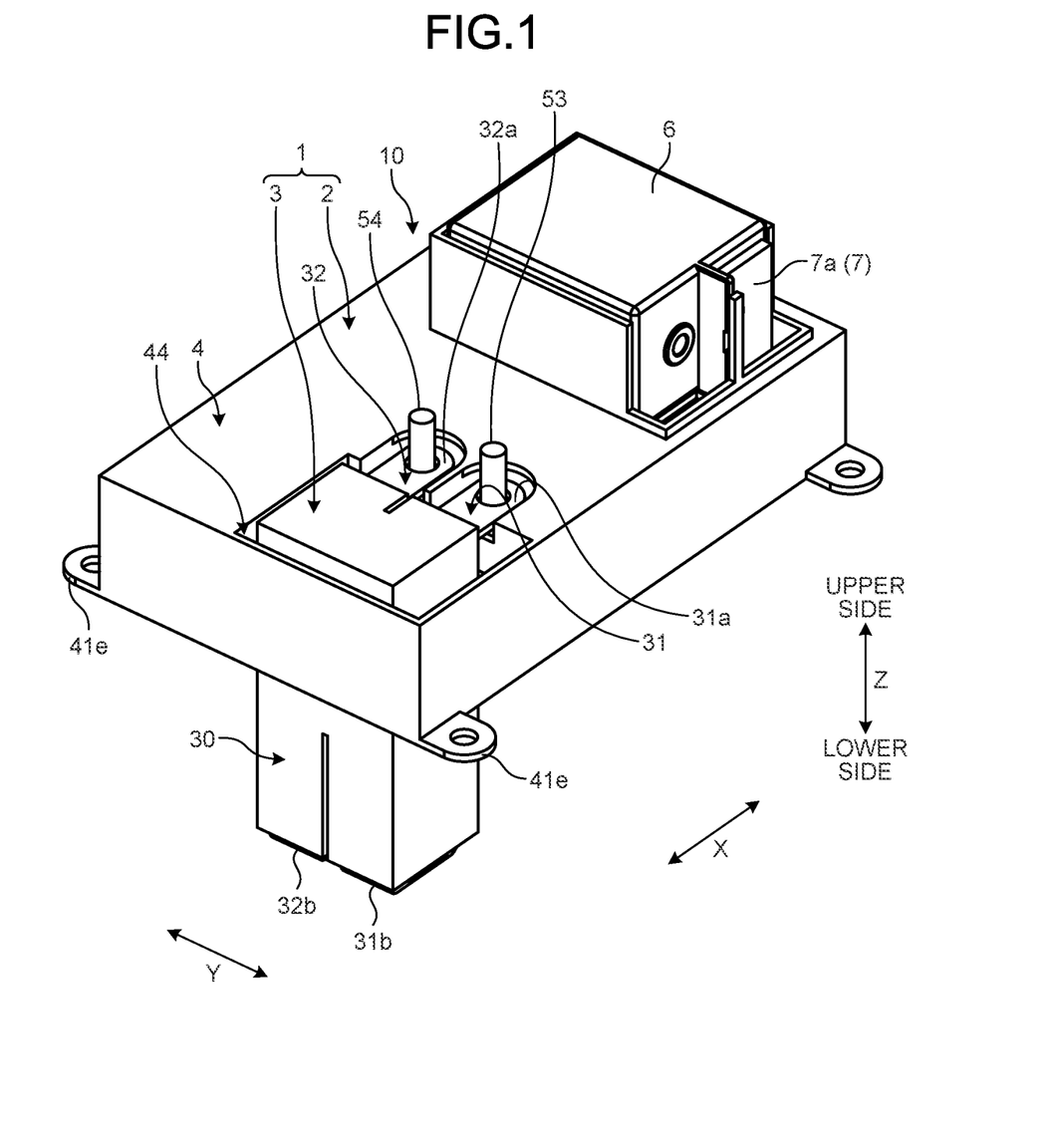
FIG. 1 is a perspective view of a connection structure of an electrical junction box according to an embodiment.
Figure 2:
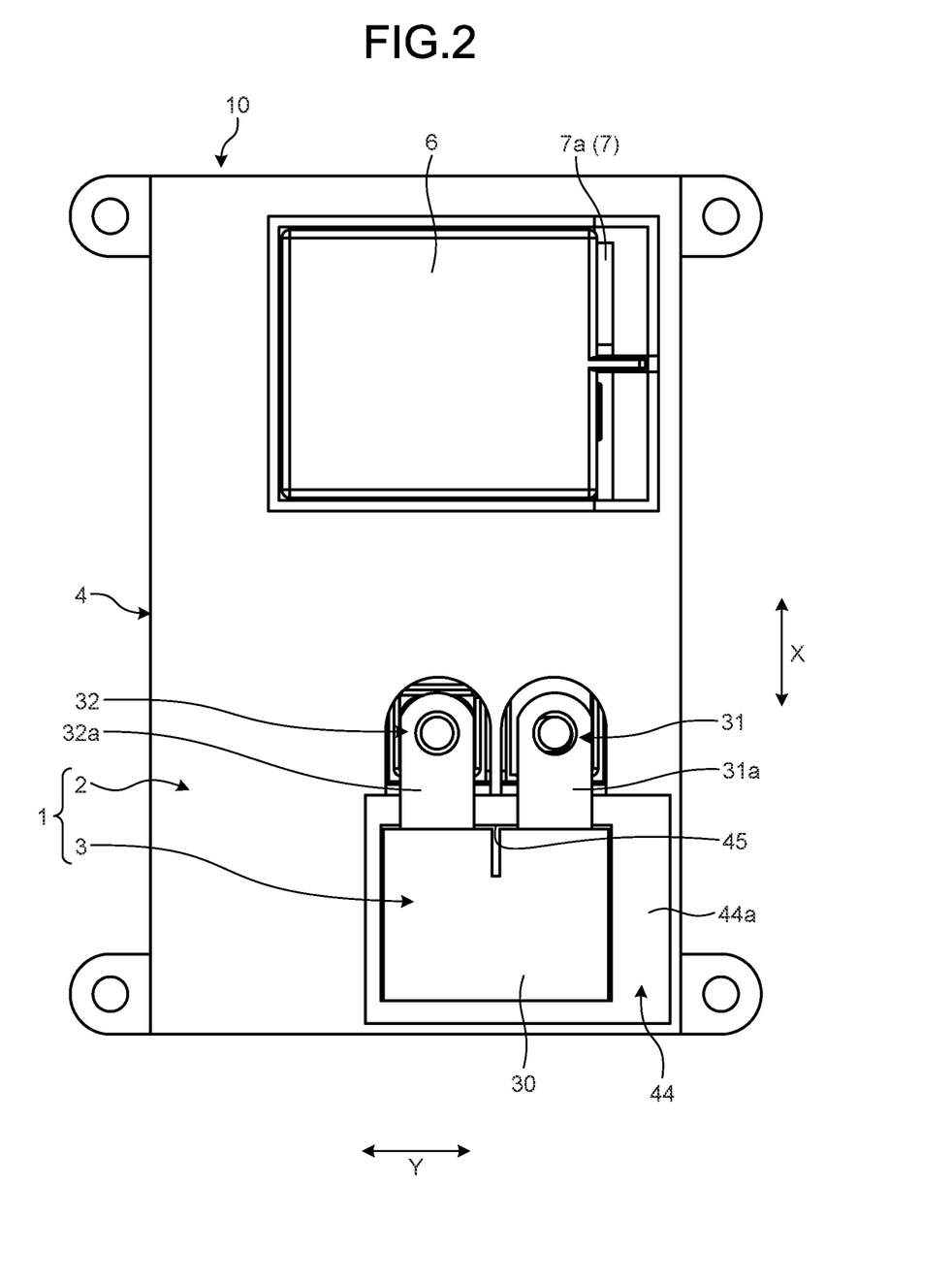
FIG. 2 is a plan view of the connection structure of the electrical junction box according to the embodiment.
Figure 3:
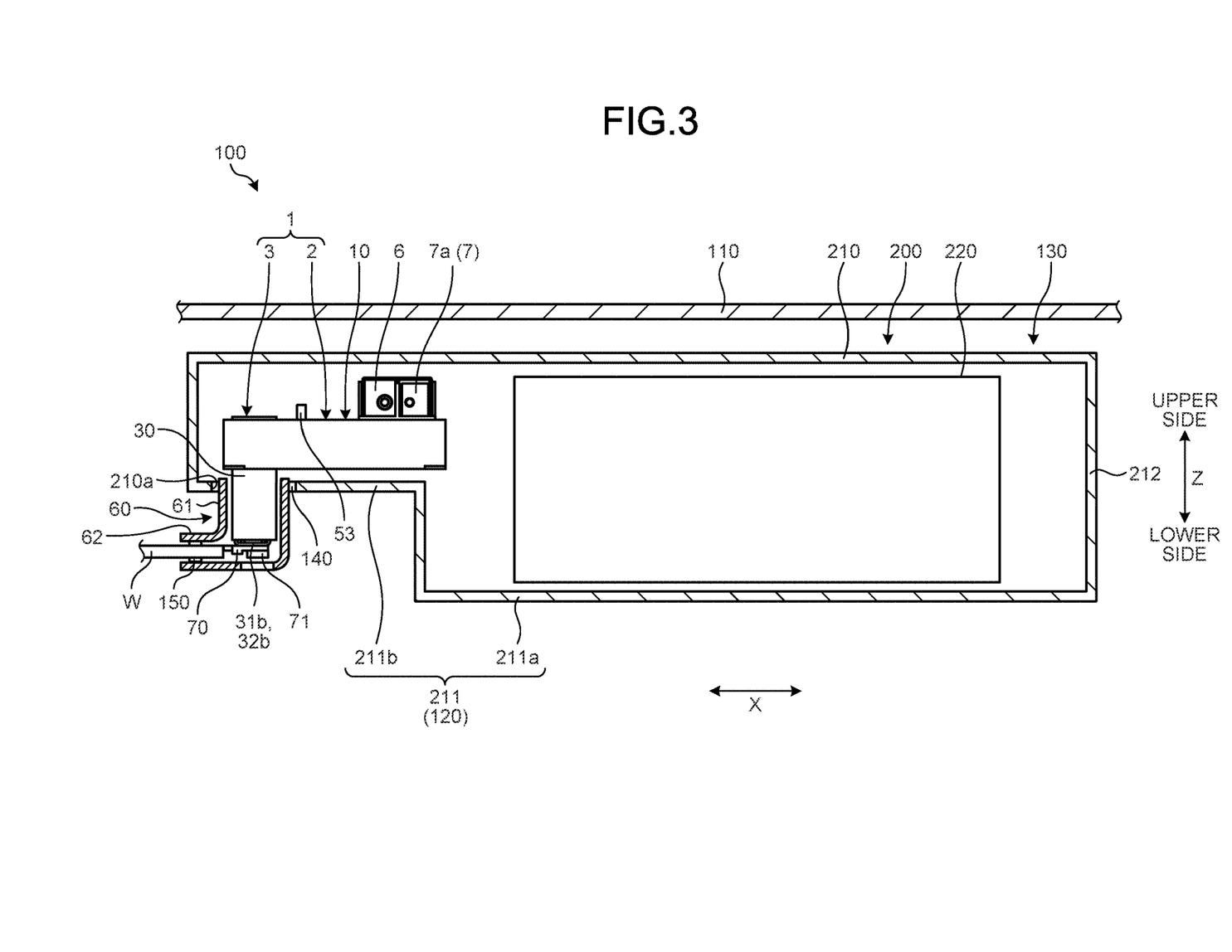
FIG. 3 is a side view of the connection structure of the electrical junction box according to the embodiment.
Figure 5:
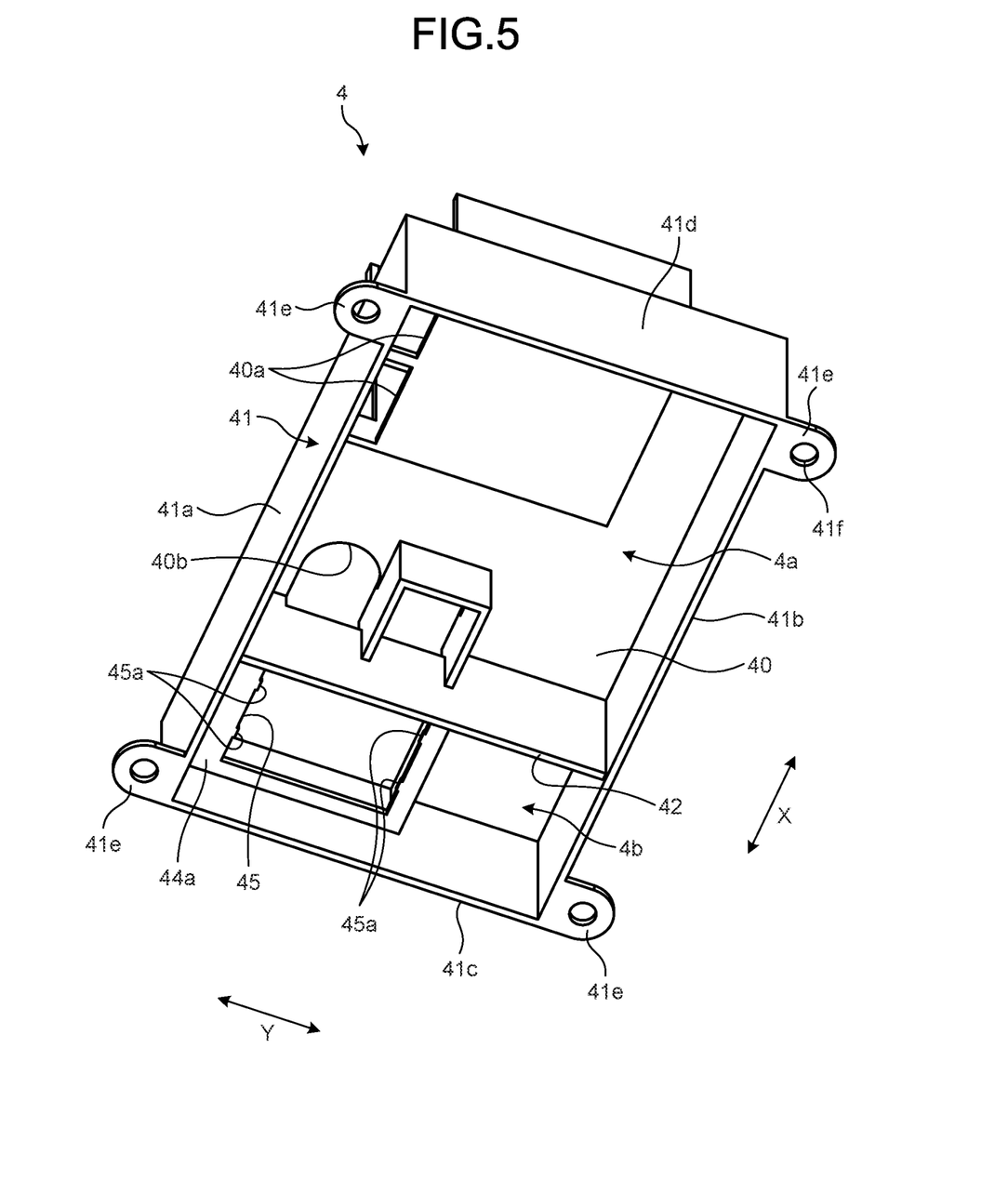
FIG. 5 is a perspective view of an upper cover according to the embodiment.
Figure 6:
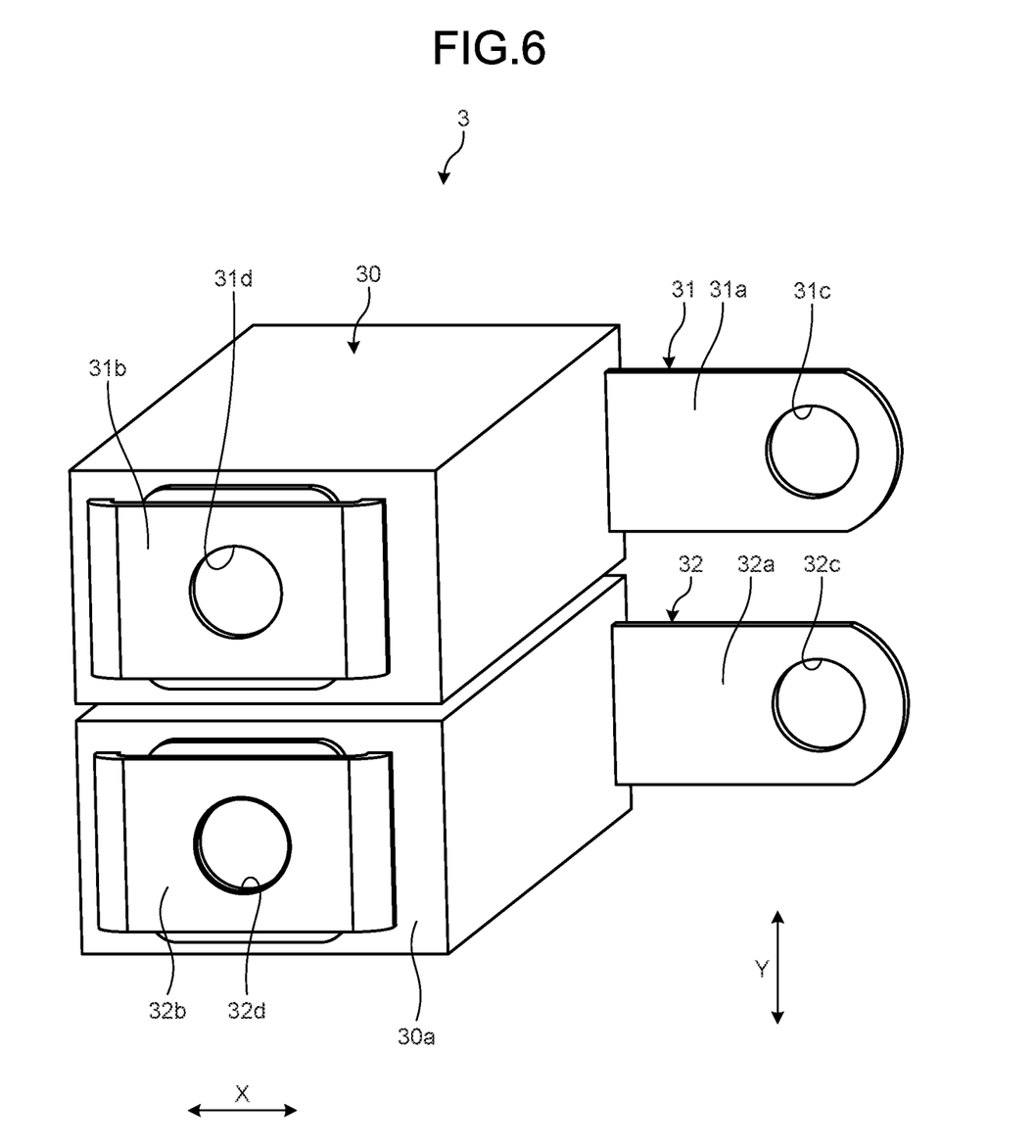
FIG. 6 is a perspective view of a terminal block according to the embodiment.
Figure 7:
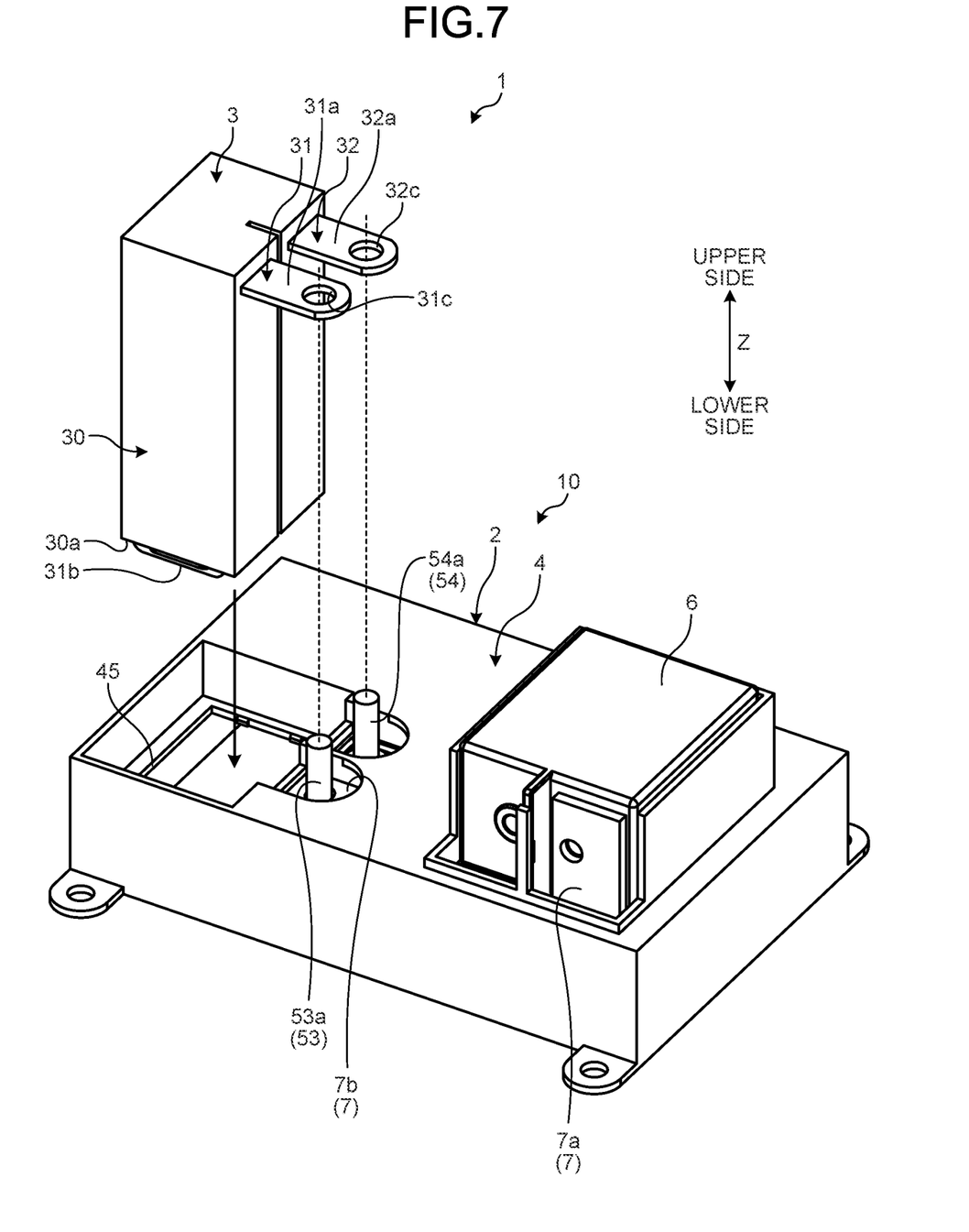
FIG. 7 is a perspective view illustrating assembly of the terminal block to a housing.

An embodiment will be described with reference to FIG. 1 to FIG. 7. The present embodiment relates to a connection structure of an electrical junction box. FIG. 1 is a perspective view of the connection structure of the electrical junction box according to the embodiment, FIG. 2 is a plan view of the connection structure of the electrical junction box according to the embodiment, FIG. 3 is a side view of the connection structure of the electrical junction box according to the embodiment, FIG. 4 is an exploded perspective view of the connection structure of the electrical junction box according to the embodiment, FIG. 5 is a perspective view of an upper cover according to the embodiment, FIG. 6 is a perspective view of a terminal block according to the embodiment, and FIG. 7 is a perspective view illustrating assembly of the terminal block to a housing.

Figure 4:
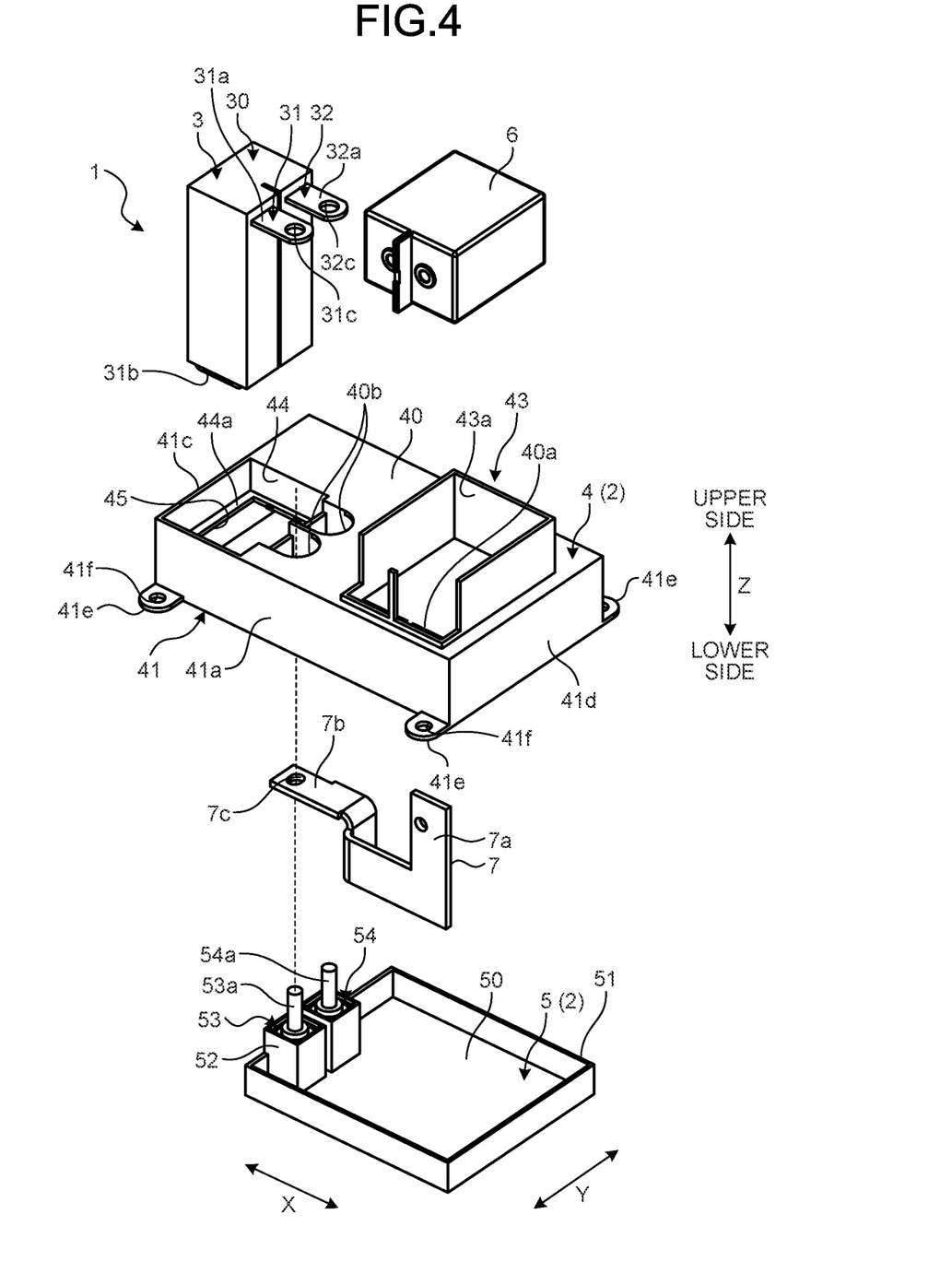
FIG. 4 is an exploded perspective view of the connection structure of the electrical junction box according to the embodiment.

As illustrated in FIG. 1 to FIG. 4, a connection structure 1 of an electrical junction box according to the present embodiment is a connection structure of a portion of an electrical junction box 10 which portion is connected to an electric wire W. The connection structure 1 of the electrical junction box includes a first housing 2 and a terminal block 3. The electrical junction box 10 includes the first housing 2, a bus bar 7, bolts 53 and 54, and an electronic component 6. Note that the electrical junction box 10 may include the terminal block 3. As illustrated in FIG. 4, the first housing 2 includes an upper cover 4 and a lower cover 5. In the following description, an "upper side" and "upward" mean an upper side and upward in a vehicle vertical direction Z. Also, a "lower side" and "downward" mean a lower side and downward in the vehicle vertical direction Z. For example, the electrical junction box 10 is mounted on a vehicle 100 in a posture in which the upper cover 4 is placed on an upper side of the lower cover 5 in the vehicle vertical direction Z. In the present embodiment, each unit will be described on the assumption that the electrical junction box 10 is mounted on the vehicle 100 in such a posture.

The illustrated upper cover 4 has a substantially rectangular parallelepiped shape and is opened downward. The upper cover 4 is molded from an insulating synthetic resin, for example. As illustrated in FIG. 4 and FIG. 5, the upper cover 4 has a top wall 40, a side wall 41, a partition wall 42, and a holding portion 43. The top wall 40 is a wall portion facing the lower cover 5 in the vehicle vertical direction Z. The side wall 41 is a square tubular wall portion, and is erected downward from an edge portion of the top wall 40. The side wall 41 has a first side wall 41a, a second side wall 41b, a third side wall 41c, and a fourth side wall 41d.

The first side wall 41a and the second side wall 41b extend in a first direction X. The first direction X is a longitudinal direction of the top wall 40. In the present embodiment, the first direction X is orthogonal to the vehicle vertical direction Z. The third side wall 41c and the fourth side wall 41d extend in a second direction Y. The second direction Y is a lateral direction of the top wall 40. The second direction Y is orthogonal to each of the vehicle vertical direction Z and the first direction X. A plurality of fixation portions 41e protruding toward a side is provided at a lower end of the side wall 41. Each of the fixation portions 41e has a hole 41f into which a fastening member such as a bolt is inserted.

As illustrated in FIG. 5, the partition wall 42 is erected from the top wall 40 and extends in the second direction Y. The partition wall 42 connects the first side wall 41a and the second side wall 41b. An internal space of the upper cover 4 is partitioned by the partition wall 42 into a first space portion 4a on one side in the first direction X and a second space portion 4b on the other side in the first direction X. The first space portion 4a is closed by the lower cover 5. On the one hand, the second space portion 4b is opened downward.

The holding portion 43 is a portion that holds the electronic component 6. The electronic component 6 is, for example, a relay. The holding portion 43 has a peripheral wall 43a erected upward from the top wall 40. A through hole 40a is formed in a portion of the top wall 40 which portion is surrounded by the peripheral wall 43a. A terminal portion 7a of the bus bar 7 is inserted into the through hole 40a. The terminal portion 7a is electrically connected to the electronic component 6.

As illustrated in FIG. 4 and the like, a recessed portion 44 recessed downward is provided in the top wall 40. The recessed portion 44 is placed closer to a side of the third side wall 41c than the partition wall 42 in the first direction X. A shape of the recessed portion 44 in a plan view is rectangular, for example. A through hole 45 is formed in a predetermined direction in a bottom wall portion 44a of the recessed portion 44. In the following description, a direction in which the through hole 45 penetrates the first housing 2 is referred to as a "penetrating direction". The penetrating direction of the through hole 45 is, for example, a height direction of the first housing 2. The through hole 45 penetrates the bottom wall portion 44a in the vehicle vertical direction Z in a state in which the electrical junction box 10 is mounted on the vehicle 100, for example. A shape of the through hole 45 in a plan view is rectangular, for example. A plurality of protrusions 45a to hold the terminal block 3 is provided in the through hole 45. A pair of notches 40b adjacent to the recessed portion 44 is formed in the top wall 40. The notches 40b are opened toward the recessed portion 44.

The illustrated lower cover 5 has a substantially rectangular parallelepiped shape and is opened upward. As illustrated in FIG. 4, the lower cover 5 has a bottom wall 50, a side wall 51, and a holding portion 52. The bottom wall 50, the side wall 51, and the holding portion 52 are integrally molded from an insulating synthetic resin, for example. The bottom wall 50 is a wall portion facing the upper cover 4 in the vehicle vertical direction Z. The side wall 51 is a square tubular wall portion, and is erected upward from an edge portion of the bottom wall 50. The lower cover 5 is fitted into the upper cover 4 in such a manner as to close the first space portion 4a of the upper cover 4.

The holding portion 52 faces the notches 40b of the upper cover 4 in the vehicle vertical direction Z. The holding portion 52 holds two bolts 53 and 54. The bolts 53 and 54 are held in a non-rotatable manner with male thread portions 53a and 54a being faced upward. The bus bar 7 has a terminal portion 7b corresponding to the bolt 53. A hole 7c into which the male thread portion 53a is inserted is provided in the terminal portion 7b. The male thread portion 53a is inserted into the hole 7c, and the bus bar 7 is held by the lower cover 5.

As illustrated in FIG. 4 and FIG. 6, the terminal block 3 includes a housing 30, a first conductor 31, and a second conductor 32. The housing 30 is molded from an insulating synthetic resin, for example. The first conductor 31 and the second conductor 32 are held by the housing 30. The housing 30 may be integrated with the first conductor 31 and the second conductor 32 by insert molding. The housing 30 is configured to secure an insulation distance between the first conductor 31 and the second conductor 32. A shape of the illustrated housing 30 is a substantially rectangular parallelepiped shape.

The illustrated first conductor 31 and second conductor 32 are bus bars. The first conductor 31 and the second conductor 32 are conductive metal plates formed of copper, aluminum, or the like. The first conductor 31 has a first terminal portion 31a and a second terminal portion 31b. The second conductor 32 includes a first terminal portion 32a and a second terminal portion 32b. The first terminal portions 31a and 32a protrude in the first direction X from an upper part of the housing 30. The first terminal portions 31a and 32a have a flat plate shape and have through holes 31c and 32c. The second terminal portions 31b and 32b are exposed downward from a lower surface 30a of the housing 30. The second terminal portions 31b and 32b have a flat plate shape and have through holes 31d and 32d.

As illustrated in FIG. 7, the terminal block 3 is inserted into the through hole 45 with the lower surface 30a facing downward. The male thread portion 53a of the bolt 53 is inserted into the through hole 31c in the first conductor 31. A nut is fastened to the male thread portion 53a, and the first conductor 31 and the bus bar 7 are fastened together. The male thread portion 54a of the bolt 54 is inserted into the through hole 32c in the second conductor 32. A nut is fastened to the male thread portion 54a, and the second conductor 32 and a mating terminal are fastened together. The terminal block 3 is supported by the first housing 2 via the bolts 53 and 54.

As illustrated in FIG. 1 and the like, the second terminal portions 31b and 32b of the terminal block 3 protrude downward from the first housing 2. Thus, the electric wire W can be connected to the electrical junction box 10 below the first housing 2.

The electrical junction box 10 of the present embodiment is accommodated in a battery pack 200 mounted on the vehicle 100, for example, as illustrated in FIG. 3. The battery pack 200 includes a second housing 210 and a plurality of battery cells 220. The second housing 210 is formed of metal such as aluminum, for example. The battery cells 220 are accommodated inside the second housing 210.

The battery pack 200 is arranged below an interior material 110 of the vehicle 100. The interior material 110 is a member included in a floor of the vehicle cabin of the vehicle 100. The interior material 110 is, for example, a formed floor carpet. The battery pack 200 is arranged in a housing space 130 below the interior material 110.

The first housing 2 of the electrical junction box 10 is accommodated inside the second housing 210. The fixation portion 41e of the first housing 2 is fixed to the second housing 210 by a fastening member. That is, the first housing 2 is fixed to the vehicle 100 via the second housing 210. In the second housing 210 of the present embodiment, a bottom wall 211 is composed of a floor panel 120. That is, a part of the floor panel 120 also functions as the bottom wall 211 of the second housing 210. The second housing 210 has a side wall 212 erected from the bottom wall 211. The bottom wall 211 and the side wall 212 form a housing space to house the battery cells 220 and the first housing 2. The bottom wall 211 has a first supporting portion 211a that supports the battery pack 200, and a second supporting portion 211b that supports the first housing 2. A frame member that protects the battery pack 200 is arranged below the floor panel 120.

The electrical junction box 10 of the present embodiment connects a battery cell 220 and an electric wire W. The electric wire W is arranged along a lower surface of the floor panel 120, for example. The vehicle 100 may have a cover that covers the electric wire W from below. The first terminal portion 31a of the first conductor 31 is connected to one pole (such as anode) of the battery cell 220 via the bus bar 7 and the electronic component 6. The electronic component 6 electrically connects and disconnects the first conductor 31 and the battery cell 220. The first terminal portion 32a of the second conductor 32 is connected to the other pole (such as cathode) of the battery cell 220 inside the second housing 210.

The second terminal portion 31b of the first conductor 31 and the second terminal portion 32b of the second conductor 32 protrude downward from the first housing 2. The second supporting portion 211b of the second housing 210 has a through hole 210a into which the terminal block 3 is inserted. The housing 30 of the terminal block 3 is inserted into the through hole 210a. That is, the second terminal portion 31b of the first conductor 31 and the second terminal portion 32b of the second conductor 32 protrude downward from the second housing 210. That is, the second terminal portion 31b of the first conductor 31 and the second terminal portion 32b of the second conductor 32 protrude downward from the floor panel 120.

A tubular housing 60 is fitted to the through hole 210a. The housing 60 has a first tube portion 61 and a second tube portion 62. The first tube portion 61 and the second tube portion 62 are, for example, orthogonal to each other. The first tube portion 61 is fitted to the through hole 210a. A gap between an outer side surface of the first tube portion 61 and the through hole 210a is sealed by a sealing member 140. The housing 30 of the terminal block 3 is inserted into the first tube portion 61. The electric wire W is inserted into the second tube portion 62 and is held by the second tube portion 62. An electric wire W is connected to each of the second terminal portions 31b and 32b. A terminal 70 is connected to a leading end of each of the electric wires W. The terminals 70 are respectively fixed to the second terminal portions 31b and 32b by fastening members 71. A gap between an inner side surface of the second tube portion 62 and the electric wires W is sealed by a sealing member 150. The two electric wires W are connected to a load mounted on the vehicle 100, for example. For example, electric wires W are connected to a traveling motor via an inverter.

With a configuration in which the second terminal portions 31b and 32b protrude from the second housing 210, it becomes possible to perform work of connecting and disconnecting the electric wires W to and from the electrical junction box 10 in an external space of the second housing 210. Thus, it is possible to connect the electric wires W to the battery pack 200 from the outside after assembling of the battery pack 200. Also, when the battery pack 200 is replaced, the electric wires W can be disconnected outside the battery pack 200. Thus, replacement work is easy. Complicated work such as arranging the electric wires W inside the battery pack 200 becomes unnecessary, and assembly man-hours are reduced. Also, since the electric wires W are exposed to the outside of the battery pack 200, the battery pack 200 can be downsized.

Also, the second terminal portions 31b and 32b protrude downward from the floor panel 120 in the present embodiment. Thus, it is possible to perform work of connecting and disconnecting the electric wires W to and from the electrical junction box 10 in an external space of the vehicle 100. Thus, it is possible to connect the electric wires W to the battery pack 200 from the outside after fixing the battery pack 200 to the floor panel 120. Also, when the battery pack 200 is replaced, the electric wires W can be disconnected outside the vehicle 100.

Note that a posture of the electrical junction box 10 is not limited to the posture in which the housing 30 protrudes downward from the first housing 2. For example, the electrical junction box 10 may be fixed to the vehicle 100 in a posture in which the housing 30 protrudes in a horizontal direction from the first housing 2. In this case, the second terminal portions 31b and 32b protrude in the horizontal direction toward an external space of the second housing 210. Also, the second terminal portions 31b and 32b may protrude in the horizontal direction into an external space of the vehicle 100. That is, the electrical junction box 10 may be mounted on the vehicle 100 in such a manner that the penetrating direction of the through hole 45 coincides with the vehicle vertical direction Z, or may be mounted on the vehicle 100 in such a manner that the penetrating direction coincides with a vehicle front-back direction or vehicle width direction. The electrical junction box 10 can be mounted on the vehicle 100 in such a manner that the penetrating direction becomes an arbitrary direction.

As described above, the connection structure 1 of the electrical junction box according to the present embodiment includes the first housing 2 and the terminal block 3. The first housing 2 is fixed to the vehicle 100, and has a through hole 45. The terminal block 3 is inserted into the through hole 45, has the first conductor 31 and the second conductor 32, and is supported by the first housing 2. The first conductor 31 and the second conductor 32 respectively have the first terminal portions 31a and 32a placed on one side of the through hole 45 in the penetrating direction in which the through hole 45 penetrates the first housing 2, and the second terminal portions 31b and 32b that protrude from the first housing 2 toward the other side in the penetrating direction and that are connected to the electric wires W. According to the connection structure 1 of the electrical junction box of the present embodiment, the electrical junction box 10 can be connected to the electric wires W outside the first housing 2.

The vehicle 100 of the present embodiment includes the battery pack 200 arranged below the interior material 110 included in the floor of the vehicle cabin. The first housing 2 is arranged inside the second housing 210, which is a housing of the battery pack 200, and is fixed to the vehicle 100 via the second housing 210, for example. The terminal block 3 penetrates the bottom wall 211 of the second housing 210, and the second terminal portions 31b and 32b protrude downward from the bottom wall 211. With such a configuration of the present embodiment, it becomes possible to connect/disconnect the electric wires W to/from the battery pack 200 outside the battery pack 200.

In the present embodiment, the bottom wall 211 of the second housing 210 is the floor panel 120 of the vehicle 100. With such a configuration, it becomes possible to connect/disconnect the electric wires W to/from the battery pack 200 outside the vehicle 100. Also, since the second housing 210 is made up of the floor panel 120, a height of the battery pack 200 can be reduced.

Modification Example of Embodiment

A modification example of the embodiment will be described. A second housing 210 may be separated from a floor panel 120. In this case, the second housing 210 may be fixed to the floor panel 120 and supported by the floor panel 120. A terminal block 3 may penetrate a bottom wall 211 of the second housing 210 and the floor panel 120. In this case, second terminal portions 31b and 32b protrude downward from the floor panel 120 and are connected to electric wires W.

An electrical junction box 10 may be arranged outside a second housing 210. In this case, a first housing 2 is fixed to a floor panel 120 and is fixed by the floor panel 120, for example. A terminal block 3 may penetrate the floor panel 120, and second terminal portions 31b and 32b may protrude downward from the floor panel 120.

A connection structure 1 of an electrical junction box may be applied to a device different from a battery pack 200. A position of a first housing 2 of an electrical junction box 10 is not limited to be below an interior material 110. A first housing 2 may be fixed to an upper surface of an interior material 110, for example. In this case, a terminal block 3 may penetrate the interior material 110 and second terminal portions 31b and 32b may protrude into a housing space 130. A first housing 2 may be fixed to an upper stage of a step portion. In this case, a terminal block 3 may be connected to an electric wire W in a lower stage of the step portion.

A position of a second terminal portion 31b of a first conductor 31 and a position of a second terminal portion 32b of a second conductor 32 may be different in a vehicle vertical direction Z. The number of conductors included in a terminal block 3 is not limited to two. One terminal block 3 may hold one conductor. In this case, a connection structure 1 of an electrical junction box may include a plurality of terminal blocks 3. A first conductor 31 and a second conductor 32 are not limited to bus bars. Shapes and arrangements of first terminal portions 31a and 32a and shapes and arrangements of second terminal portions 31b and 32b are not limited to the illustrated shapes and arrangements.

The contents disclosed in the above-described embodiment and modification examples can be arbitrarily combined and executed.

A connection structure of an electrical junction box according to the embodiment includes a first housing in which a through hole is formed, and a terminal block that is inserted into the through hole, has a conductor, and is supported by the first housing. The conductor has a first terminal portion placed on one side of the through hole in a penetrating direction in which the through hole penetrates the first housing, and a second terminal portion that protrudes from the first housing toward the other side in the penetrating direction and that is connected to an electric wire. According to the connection structure of the electrical junction box of the embodiment, there is an effect that connection to an electric wire can be made outside a housing of the electrical junction box.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connection structure of an electrical junction box comprising:
   a first housing which is fixed to a vehicle and in which a through hole is formed;
   an electronic component held by the first housing;
   a terminal block that is inserted into the through hole, has a conductor and a housing that holds the conductor;
   a bus bar held by the first housing, and connecting the electronic component and the conductor; and
   a bolt held by the first housing, wherein
   the conductor includes a first terminal portion placed on one side of the through hole in a penetrating direction in which the through hole penetrates the first housing, and a second terminal portion that protrudes from the first housing toward the other side in the penetrating direction and that is connected to an electric wire,
   the first terminal portion protrudes from the housing in a direction orthogonal to the penetrating direction,
   the bolt is inserted into the bus bar and first terminal portion, and fastens together the conductor and the bus bar with a nut, and
   the terminal block is supported by the first housing via the bolt.

2. The connection structure of the electrical junction box according to claim 1, wherein
   the vehicle includes a battery pack arranged below an interior material included in a floor of a vehicle cabin,
   the first housing is accommodated inside a second housing, which is a housing of the battery pack, and is fixed to the vehicle via the second housing, and
   the terminal block penetrates a bottom wall of the second housing, and the second terminal portion protrudes downward from the bottom wall.

3. The connection structure of the electrical junction box according to claim 2, wherein
   the bottom wall is a floor panel of the vehicle.

4. The connection structure of the electrical junction box according to claim 1, wherein
the vehicle includes a battery pack arranged below an interior material included in a floor of a vehicle cabin,
the first housing is arranged between the interior material and a floor panel of the vehicle, and
the terminal block penetrates the floor panel, and the second terminal portion protrudes downward from the floor panel.

5. The connection structure of the electrical junction box according to claim 2, wherein
the bottom wall has a first supporting portion that supports the battery pack and a second supporting portion that supports the first housing,
the second supporting portion is positioned above the first supporting portion in a vehicle vertical direction, and
the terminal block penetrates the second supporting portion.

\* \* \* \* \*